United States Patent Office 3,404,037
Patented Oct. 1, 1968

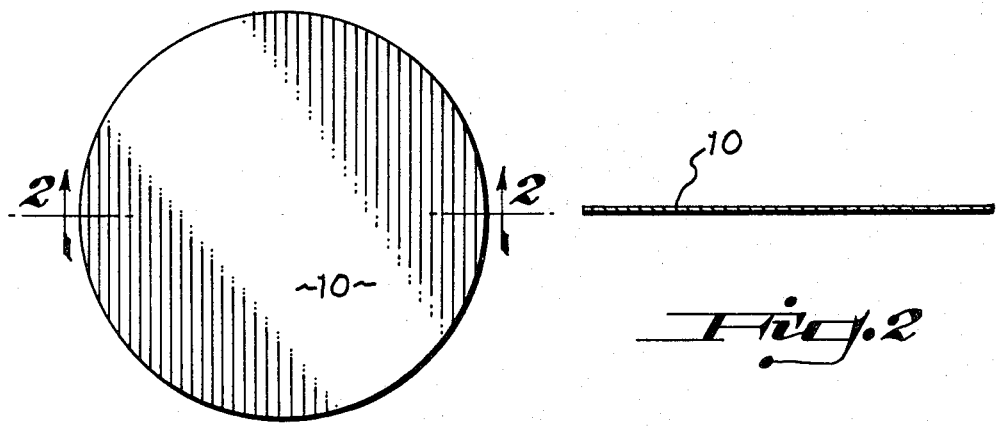
Fig. 1
Fig. 2
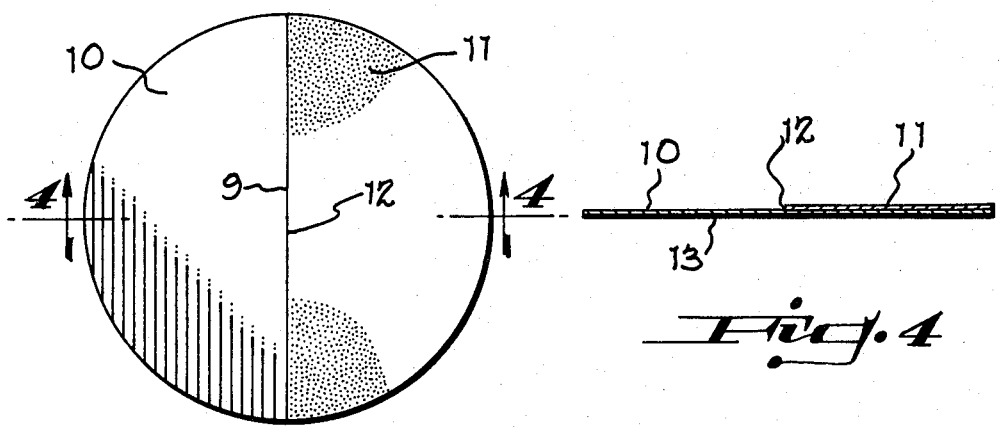
Fig. 3
Fig. 4
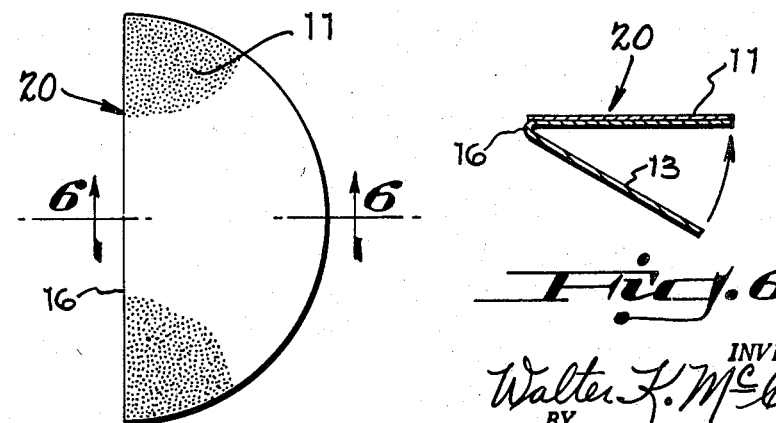
Fig. 5
Fig. 6
INVENTOR.
Walter K. McCarter
BY
Wood, Herron & Evans.
ATTORNEYS.

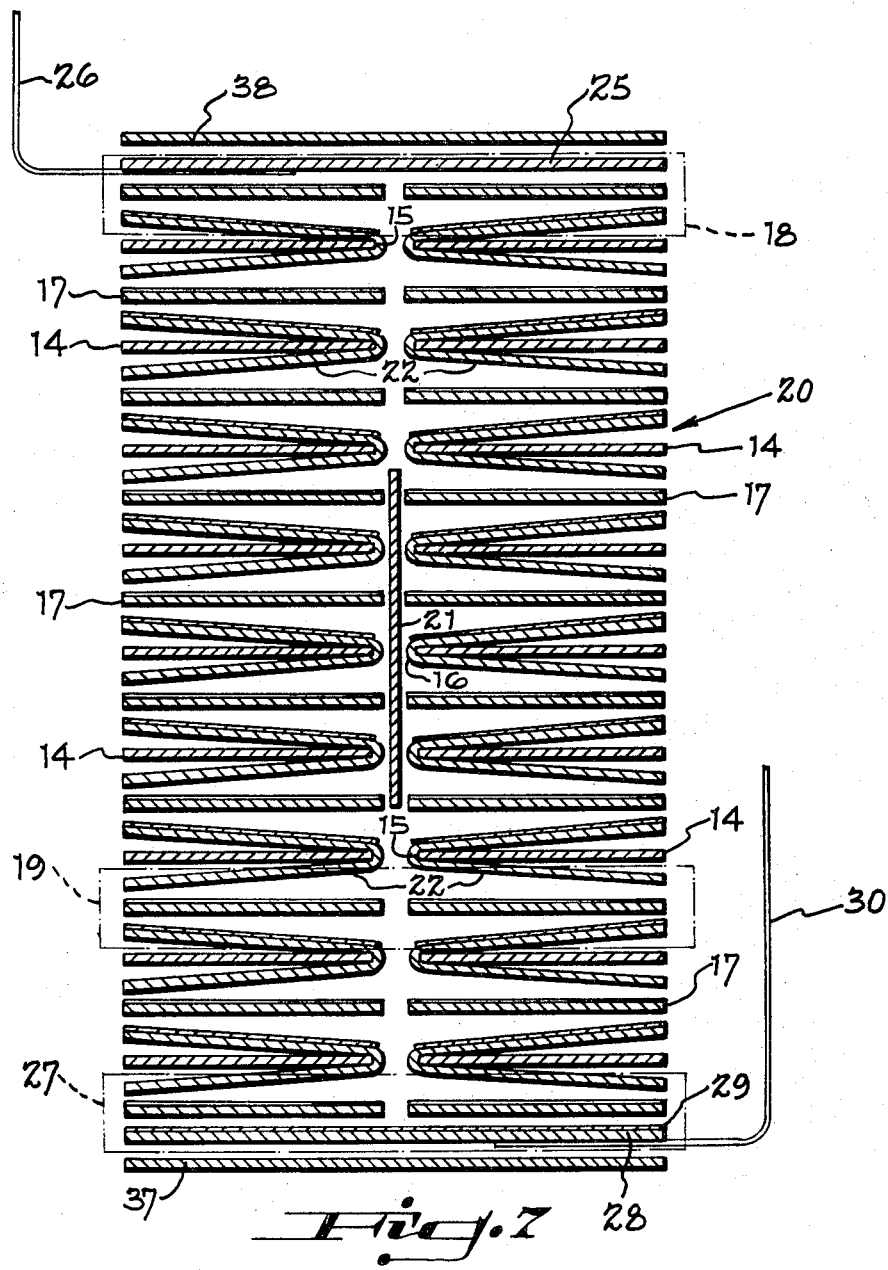

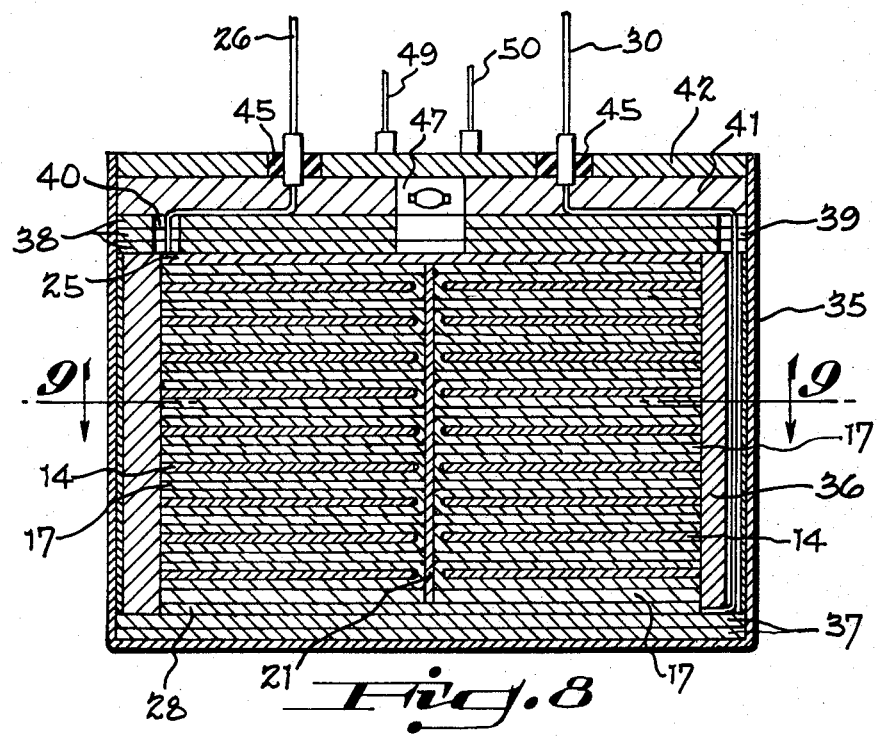
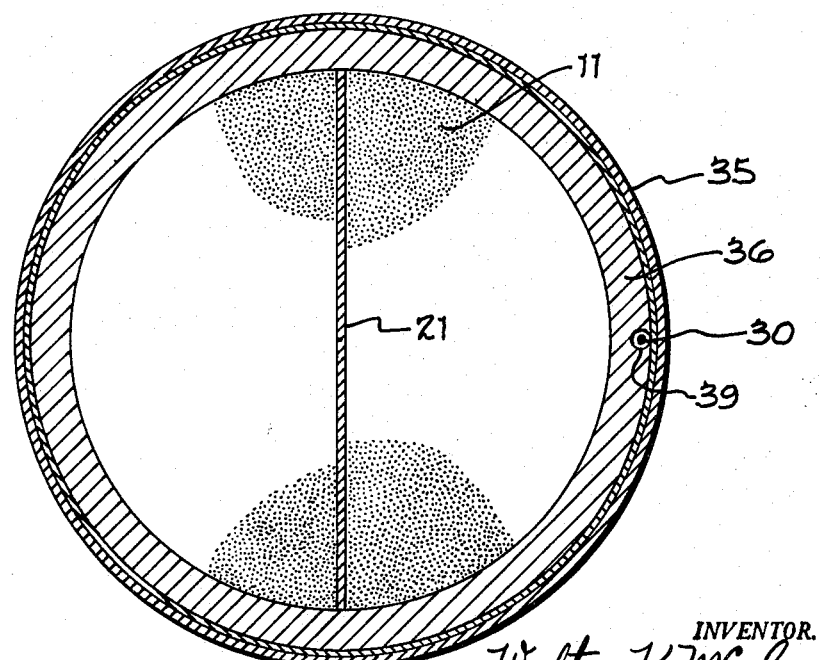

3,404,037
MULTIPLE CELL THERMAL BATTERY
Walter K. McCarter, Joplin, Mo., assignor to Eagle-Picher Industries, Inc., a corporation of Ohio
Filed Apr. 23, 1964, Ser. No. 362,012
6 Claims. (Cl. 136—83)

ABSTRACT OF THE DISCLOSURE

A multiple cell thermal battery having a plurality of electrodes, each one of which is formed from a flat symmetrical plate of cathodic material folded upon itself along a line of symmetry. Each folded plate has a coating of anodic material on one outer exposed face. The folded electrodes are located in the battery with the coated side of one folded electrode located in juxtaposition to, but spaced from, the uncoated side of the next adjacent electrode, there being a solid fuseable electrolyte located between adjacent electrodes.

---

This invention relates to an improved electrode construction of the type particularly designed for use in thermal batteries.

A thermal cell or battery utilizes as the electrolyte an inorganic salt composition which is solid and nonconducting at ordinary temperatures. It becomes active and capable of producing electrical current when heated sufficiently to fuse the salt whereupon the electrolyte becomes an ionic conductor. One suitable electrolyte composition is potassium chloride and lithium chloride in eutectic portions.

Various electrochemical systems are known for use in thermal batteries. The most common comprises a calcium anode, a nickel or iron cathode, and a calcium chromate, sodium chromate or vanadium pentoxide depolarizer. Insofar as this invention is concerned, the electrochemical system utilized in the cell is of no particular significance.

In the past, it has been proposed to form the electrodes of thermal batteries from a sheet of cathodic material in the shape of two circular discs interconnected by a narrow connector strip. In other words, the electrodes were made from a cathodic sheet of material shaped like a flat dumbbell. The dumbbell shaped electrode was folded along a fold line through the narrow connector strip so as to place the two circular discs in face to face superposed engagement. The resulting structure was a generally two ply circular disc having the plys interconnected by a thin connector strip. One face of the two ply disc was coated with the calcium or other anodic material and the opposite face of the disc was impregnated, coated, or placed in contact with the depolarizer. To form a complete battery, these electrodes were placed in a stack with solid electrolytes located between adjacent electrodes. The uncoated disc thus constituted one electrode of a first cell and the coated disc constituted an electrode of a different, adjacent cell, the narrow conductor strip serving to interconnect the two cells in series.

It has been an objective of this invention to provide an improved electrode configuration for use in thermal cells having higher current and voltage capabilities than any heretofore known. One factor which limits the maximum current output of thermal cells incorporating electrodes of the type described above is the width or cross sectional area of the connecting strip between the two circular portions of the electrode. Heretofore, when a high voltage and current thermal battery was required, the connector strip was beefed up or strengthened by spot welding additional thicknesses to the connector. In this way the connector was reinforced to the point where it could carry the high currents and voltages without failure, at least for some minimum time. However, reinforced connectors had serious limitations, primary among which was the additional cost of manufacturing electrodes with spot welded intercell connector reinforcements.

This invention is predicated upon the discovery that a superior battery may be made less expensively without any necessity for reinforcing the intercell connector by forming the electrode of a symmetrical plate doubled over upon itself or folded along a fold line equal in length to the greatest transverse dimension of the electrode parallel to the fold line. In a preferred form of battery the plates are circular and are folded along a diametral line. The battery comprises two stacks of these semi circular plates disposed with their fold lines parallel to one another. In such a battery the intercell connectors or fold lines are twice as wide as the cell diameter. These connectors thus provide a many-fold increase in current carrying capacity over previously proposed constructions. It will readily be appreciated that the present folded electrode concept can be used to advantage with electrodes of other than circular configuration. For example, if the electrodes are rectangular before folding, the intercell connector will be twice as wide as the resulting electrode width.

The primary advantage of this type of electrode construction is that it enables the connector to carry larger voltages and currents for a longer time without failure. Furthermore, the cost of manufacturing the electrode is substantially reduced. In connection with the production cost reduction, it is obvious that a symmetrical blanking die, as for example a circular die, is much less expensive than a dumbbell shaped die. Additionally, the elimination of spot welded reinforcements substantially reduces cost from a labor as well as a material standpoint while simultaneously increasing the reliability and life of the electrodes and batteries.

These and other objects and advantages of the present invention will be more readily apparent from the following detailed description taken in conjunction with the accompanying drawings in which:

FIGURE 1 is a top plan view of an electrode blank.

FIGURE 2 is a cross sectional view taken along line 2—2 of FIGURE 1.

FIGURE 3 is a top plan view of the electrode blank after the application of the anodic material to the blank.

FIGURE 4 is a cross sectional view taken along line 4—4 of FIGURE 3.

FIGURE 5 is a top plan view of the electrode after it has been partially folded into its final electrode configuration.

FIGURE 6 is a cross sectional view taken along line 6—6 of FIGURE 5.

FIGURE 7 is an exploded cross sectional view of the assembled electrodes of a thermal battery.

FIGURE 8 is a vertical cross section of a thermal battery incorporating the improved electrode of this invention.

FIGURE 9 is a cross sectional view taken along line 9—9 of FIGURE 8.

Referring first to FIGURE 1, it will be seen that one preferred form of electrode constructed in accordance with the present invention is made from a sheet of cathodic material such as nickel or iron. In this emobdiment the electrode plate is circular in configuration after having been stamped or blanked from a sheet metal ribbon. It would, however, involve no departure from this invention to use square or rectangular electrode blanks.

As may be seen in FIGURE 3, one-half of one side of the electrode plate is coated with the anodic material. In the preferred embodiment, this is a thin ribbon from .002″ to .010″ in thickness of calcium. This ribbon is semi-circular in shape and is applied to one-half of the electrode plate by any conventional method.

The line of demarcation 9 between the calcium deposit 11 and the nickel or iron electrode blank 10 defines a fold line 12. A completed electrode 20 is made by folding the calcium coated electrode blank 10 along the diametrical fold line 12 so as to place the two halves of the uncoated side 13 of the plate 10 in face to face engagement. In other words, the plate is folded approximately 180° along fold line 12 in the direction which avoids contact of the calcium with base metal of the plate 10.

Referring to FIGURE 7, it will be seen that a heat pad 14 is located between the folded halves of each electrode plate 20. The planar profile of each heat pad 14 is identical to that of the folded electrode 20. When inserted between the halves of the folded plate, the straight edge 15 of the semi-circular heat pad abuts against the folded edge section 16 of the electrode plate 10.

The composition of the heat pad is not critical and forms no part of this invention. It may be any conventional composition currently used in the manufacture of thermal batteries. In fact, the heat pad may be completely omitted from the battery and an external source of heat utilized to fuse or melt the solid electrolyte.

An electrolyte-depolarizer pad 17 separates each of the folded electrodes 20 of the battery. Each of these pads is a two ply semi-circular pad. The bottom ply is a conventional solid electrolyte such as potassium chloride and lithium chloride in eutectic proportions. The upper ply or laminate of each pad is composed of a depolarizer such as calcium chromate, sodium chromate or vanadium pentoxide.

The electrolyte-depolarizer pads 17 are placed between the folded electrodes with the lower layer or laminate of electrolyte in engagement with the anodic calcium deposit of the electrode and the depolarizer layer in engagement with the nickel or iron cathodic material of the electrode.

The battery illustrated in FIGURES 7 through 9 may be described as a ten cell, series connected thermal battery. More accurately, the battery may be described as having two parallel connected banks of ten series connected cells. Each bank is shown as separated or spaced from the other by an insulator 21 of mica or isomica material. However, this insulator may be completely omitted if desired.

A single cell 19 consists of the two lower cathodic halves 22 of a pair of adjacent electrodes, the upper anodic calcium coated halves of another pair of electrodes 20, and the electrolyte-depolarizer pads 17 sandwiched between these cathodes and electrodes.

As shown most clearly in FIGURE 7, the uppermost one 18 of the cells 19 consists of the upper calcium coated halves of two abutting electrodes 20 and a circular positive plate 25 of nickel or iron. Between the nickel plate and the upper halves of the two topmost electrodes 20 are located the electorlyte-depolarizer pads 17. Positive lead 26 of the battery is electrically connected to the plate 25 as by soldering or welding.

Referring still to FIGURE 7, it will be seen that the bottom cell 27 of the stack consists of the lower halves of two abutting electrodes 20, a circular calcium coated nickel or iron plate 28, a pair of electrolyte depolarizer pads 17 sandwiched between the calcium coating 29 of plate 28 and the bottom surfaces of the two lower electrodes 20. A negative lead 30 of the battery is welded or soldered to the bottom of the negative plate 28.

Referring to FIGURES 8 and 9, there is shown a complete battery consisting of the ten cells of FIGURE 7 housed within a casing 35. The casing 35 is sealed so as to be gas tight and hold the battery components within the casing under substantial axial pressure. It consists of an inner cylindrical sleeve 36 of Fibrefrax or other insulating material. Surrounding this sleeve 36 is a thin sheet of mica wrap. A pair of circular asbestos discs 37 are located beneath the cells and three similar asbestos discs 38 are located over the top of the cells. Each of the three top discs 38 has a pair of apertures 39, 40 through which the battery leads or terminals 30, 26 respectively extend. A thick disc 41 of epoxy potting material fits over the top of the asbestos discs 38 and fills the space between the disc 38 and a cylindrical case header 42. The header may be made from any high strength material which should preferably be very light and tough. A suitable plastic material for the header as well as for the outer case 44 is disclosed in United States Patent No. 2,720,821 to J. S. Bone.

The electrical leads 30, 26 are embedded in the epoxy potting 41 and extend through the header 42. Conventional gas tight seals 45 surround each lead 26, 30 in the area in which they pass through the header 42.

The heat pads may be ignited by any conventional ignition system. In the preferred embodiment, they are ignited by an electrically energized squib 47 located beneath the header 42 and embedded in the epoxy potting 41. For ignition purposes, a pair of electrical leads 49, 50 extend through the header 42 of the battery into the squib 47. Gas tight seals similar to the seals 45 surround each of the leads 49, 50.

When ignited by electrical current, the squib ignites a fuse train (not shown) which in turn ignites each of the heat pads. Upon ignition of the heat pads, the normally solid electrolyte pads 17 are melted whereupon they become ionic conductors. As soon as the electrolyte is ionically conductive, electrical energy may be withdrawn from the battery via the leads 26, 30.

The battery disclosed herein is a high performance and high current voltage capability energy cell. In fact, a ten cell battery of the type disclosed herein produced 455 amperes at 1.62 volts per cell when a .035 ohm load and a current shunt were placed directly across the battery terminals. This was approximately an 80% improvement over cells of the same size with the old conventional electrode configuration. The battery of this invention also has the additional advantage of being much less expensive to manufacture because of the simplicity of the electrode construction.

From the above disclosure of the general principles of this invention and the preceding description of a preferred embodiment, those skilled in the art will readily comprehend various modifications to which the invention is susceptible. Therefore, I desire to be limited only by the scope of the following claims.

Having described my invention, I claim:

1. A multiple cell battery having a plurality of electrodes, the improvement wherein each of said electrodes is formed from a flat symmetrical plate of cathodic material, said plate being folded upon itself along a line of symmetry to form a double thickness plate having a pair of outer exposed surfaces and a pair of inner surfaces spaced apart but located in face to face juxtaposition, said line of symmetry fold line being equal in length to the greatest transverse dimension of the electrode plate parallel to the fold line, one exposed outer side surface of said folded double thickness plate having a coating of anodic material thereon and the opposite outer exposed side surface of said folded double thickness plate being uncoated and free of said anodic material, said inner surfaces of said folded double thickness plate also being uncoated and free of said anodic material, and said folded electrodes being arranged in said battery with the coated side of one electrode located in juxtaposition to but spaced from the uncoated side of the next adjacent electrode.

2. A multiple cell thermal battery having a plurality of electrodes, the improvement wherein each of said electrodes is formed from a flat symmetrical plate of cathodic material, said plate being folded upon itself along a line of symmetry to form a double thickness plate having a pair of outer exposed surfaces and a pair of inner surfaces spaced apart but located in face to face juxtaposition, said line of symmetry fold line being equal in length to the greatest transverse dimension of the electrode plate parallel to the fold line, one exposed outer side surface of said folded double thickness plate having a coating of anodic material thereon and the opposite exposed outer side surface of said folded double thickness plate being uncoated and free of said anodic material, said inner surfaces of said folded double thickness plate also being uncoated and free of said anodic material, said folded electrodes being located in said battery with the coated side of one folded electrode located in juxtaposition to but spaced from the uncoated side of the next adjacent electrode, said electrodes being spaced apart by a normally solid fusible electrolyte.

3. The battery of claim 1 wherein said cathodic material is nickel and said anodic material is calcium.

4. The battery of claim 2 wherein said cathodic material is nickel and said anodic material is calcium.

5. The battery of claim 1 wherein each of said electrodes is semi-circular in shape and is formed from a flat circular plate.

6. The battery of claim 2 wherein each of said electrodes is semi-circular in shape and is constructed from a flat circular plate.

References Cited
UNITED STATES PATENTS

| | | | |
|---|---|---|---|
| 263,124 | 8/1882 | De Kabath | 136—70.5 |
| 439,850 | 11/1890 | Woolf | 136—46 |
| 718,045 | 1/1903 | Barham | 136—46 |
| 2,999,122 | 9/1961 | Zanner | 136—90 |
| 3,055,960 | 9/1962 | Yalom et al. | 136—83 |

WINSTON A. DOUGLAS, *Primary Examiner.*

A. SKAPARS, *Assistant Examiner.*